United States Patent [19]
Vader et al.

[11] Patent Number: 5,386,662
[45] Date of Patent: Feb. 7, 1995

[54] LURE AND LEADER HOLDER

[75] Inventors: Robert L. Vader; Erik J. Vader, both of San Clemente, Calif.

[73] Assignee: Vader Marine, San Clemente, Calif.

[21] Appl. No.: 105,876

[22] Filed: Aug. 11, 1993

[51] Int. Cl.6 .......................................... A01K 97/06
[52] U.S. Cl. ................................ 43/57.2; 206/315.11
[58] Field of Search ..................... 43/57.1, 57.2, 54.1; 206/315.11, 397, 408; 242/85.1, 47.5

[56] References Cited

U.S. PATENT DOCUMENTS

| | | | |
|---|---|---|---|
| 595,998 | 12/1897 | Garland | 43/57.2 |
| 1,578,631 | 3/1926 | Bolton | 43/57.2 |
| 1,715,567 | 6/1929 | Porter | 43/57.2 |
| 2,041,231 | 5/1936 | Collins | 43/57.2 |
| 2,448,728 | 9/1948 | Omohundro | 43/57.2 |
| 2,604,721 | 7/1952 | Casciano | 43/57.2 |
| 2,730,833 | 1/1956 | Newell . | |
| 2,836,005 | 5/1958 | Jerdee | 43/57.2 |
| 4,005,541 | 2/1977 | Henrichsen | 43/57.2 |
| 4,036,451 | 7/1977 | Pipkin . | |
| 4,281,470 | 8/1981 | Anderson . | |
| 4,514,928 | 5/1985 | Hanson . | |
| 4,631,856 | 12/1986 | Born . | |
| 4,680,886 | 7/1987 | Caselli, Sr. . | |
| 4,691,471 | 9/1987 | Hansen | 43/57.2 |
| 4,703,581 | 11/1987 | Whittier . | |
| 4,742,640 | 5/1988 | Moore . | |
| 4,924,621 | 5/1990 | Hawranik et al. . | |
| 4,972,625 | 11/1990 | Barnes . | |
| 5,018,298 | 5/1991 | Spears . | |
| 5,095,645 | 3/1992 | Borawski . | |

Primary Examiner—P. Austin Bradley
Assistant Examiner—Chuck Y. Mah

[57] ABSTRACT

A rectangular rigid panel upon which is mounted a fixed spool near one edge and a sliding spool which is constrained to slide in a slot, perpendicular to the edge of the panel near where the fixed spool is mounted, toward or away from the fixed spool. A force is provided which tends to keep the sliding spool at maximum distance from the fixed spool. After anchoring the hook(s) of the lure to the panel near the fixed spool, the leader of the lure is wound 180 degrees alternately around the sliding and fixed spools in a plane parallel to the panel and the end of the leader fastened to the panel with the sliding spool at other than either end point of its travel. In the preferred embodiment, two identical panels containing a plurality of fixed and sliding spools are mounted back to back utilizing suitable spacers with the spools on the outside of the assembly and the fixed spools of one panel opposite the sliding spools of the other. In addition the panels are somewhat off-set with the edge nearest the sliding spools protruding beyond the other thereby protecting the hooks, providing a tongue to slide in a cabinet groove, and with holes installed, a way to hang the assembly from a structure.

5 Claims, 3 Drawing Sheets

LURE AND LEADER HOLDER

BACKGROUND-FIELD OF INVENTION

This invention relates to devices for holding, storing, transporting, and protecting fishing lures with hooks and leaders.

BACKGROUND-DESCRIPTION OF PRIOR ART

Artificial lures used in the sport of attracting and catching gamefish are commonly made from material such as, but not limited to, metal, wood, rigid plastic, flexible plastic, feathers, or a combination thereof. They are usually attached to a leader of up to four meters in length. Leaders are made from a material sufficiently robust to withstand cutting or breaking by the jaws, teeth, or bill of the fish. The leaders have either a loop or swivel eye at the end opposite the lure to which the fishing line is attached. The lures are most commonly equipped with a plurality of appropriately-sized hooks. Such lures are difficult to store, handle, and transport. During a fishing trip it is not uncommon for a person to take along twenty or more lures of different shapes, sizes, and materials. While fishing, it is most desirable to be able to rapidly identify and attach a new lure to the fishing line in place of the one in current use. If used in the ocean, any residue salt should be washed off the lure with fresh water and the lure allowed to air-dry in order to minimize corrosion. The hooks pose a danger to the user if improperly stored or handled.

People who fish have used tackle boxes, with and without compartments for many years to transport and store such lures. This usually results in tangled hooks, lures, and leaders, damaged lures and punctured fingers and hands. Putting each lure and its leader into separate plastic or cloth bags is sometimes employed requiring the leaders to be carefully coiled by hand. Quite often the lure, leader, and hooks become tangled using this method. The hooks also tend to snag on the bag making removal difficult. Others have tried individual pouches for the lures with the hand coiled leaders being stuffed into an adjacent common pouch. In this case, the leaders from different lures can tangle. In order to minimize corrosion if used in the ocean, the lures should be washed in fresh water and dried before stuffing them in the bags. A difficult task while actually fishing. Sometimes bags are made of a mesh material in order to allow washing and drying while the lures are in the bag; however, this greatly enhances the chance that the hooks will get caught in the mesh and make removal of the lure difficult. No matter what kind of compartment or bag is used to store the leader, the leader should not be coiled too tightly. Some leader materials tend to take a spiral set if left in a tight coil too long.

U.S. Pat. Nos. 4,703,581 to Whittier (1987), 4,742,640 to Moore (1988), 4,972,625 to Barnes (1990), and 5,095,645 to Borawski (1992) solve some of the problems of lure storage but none provide for any leader storage. U.S. Pat. Nos. 2,730,833 to Newell (1956), 4,036,451 to Pipkin (1977), 4,281,470 to Anderson (1981), 4,514,928 to Hanson (1985), 4,631,856 to Born (1986), and 4,924,621 to Hawranik et al. (1990) all provide hook and leader storage but all are totally unsuited to hold large lures with a plurality hooks and long leaders.

U.S. Pat. No. 4,680,886 to Caselli, Sr. (1987) describes a bobbin-like device containing holes into which the pointed end(s) of the hook(s) may be inserted and then the leader wound by hand around the bobbin. Hopefully, at the end of the winding process the end loop of the leader will be positioned so as to be inserted in a notch or hole with sufficient tension to keep the leader from unraveling. However, since no tensioning device is used to keep the leader tight, this may prove difficult, or impossible, to do with a stiff leader. An added problem arises if the leaders are subject to being wound too tightly over the sharp corners or grooves in the bobbin. Some leader material may be permanently bent or set if left in this condition. Furthermore, when the lure and leader are wound on the bobbin, the entire assembly must be mounted or stored in some kind of device for transport and use. This device must protect the lure from damage and the leader from being nicked or cut. If the leader is nicked it may greatly increase the chance that it may break under the stress of fighting a fish. U.S. Pat. No. 5,018,298 to Spears (1991) describes two approaches to affecting lure and leader storage. One is essentially a flat board around which the leader is wrapped, made of a material into which the point(s) of the hook(s) can be imbedded at the conclusion of the wrapping. However, this approach suffers from most of the problems of the Caselli, Sr. patent described above. The second is a round drum mounted in a frame that can be turned by a handle in order to wind the leader around the drum. The drum is made of a material into which the point(s) of the hook(s) of the lure can be imbedded at the conclusion of the winding process. If the lure is rigid and over about ten centimeters long it will stand away from the surface of the drum at all but one point. In order to accommodate such lures the diameter of the drum and or the size of the frame become so large as to make the device unduly cumbersome. Most rigid lures used for ocean sport fishing are over fifteen centimeters long.

OBJECTS AND ADVANTAGES

Accordingly, several objects and advantages of our invention are:

(a) to provide a holder upon which a lure having one or more hooks and an attached leader having either a loop or eye swivel on the end opposite the hook(s) can be easily mounted on and removed therefrom;

(b) to provide a holder which allows the lures mounted thereon to be readily and easily identified;

(c) to provide a holder for lures and leaders which can be used both for long time storage or short time storage while fishing is actually taking place;

(d) to provide a holder of sufficient size and capacity so as to accommodate most of the lures and attached leaders used in sport fishing;

(e) to provide a holder for lures and leaders which may be neatly and safely stored in a cabinet built into the fishing boat;

(f) to provide a holder for lures and leaders which can be easily transported in a protective box or bag to and from the fishing site and permanent storage;

(g) to provide a holder for lures and leaders which can be easily and readily mounted upon the boat or structure from which the fishing is done which allows easy visual identification and removal and re-attachment of the lure while fishing;

(h) to provide a holder which accepts most of the common configurations of a plurality of hooks and protects the points thereof;

(i) to provide a holder which does not require manual coiling of the leader;

(j) to provide a holder which automatically adjusts to the leader lengths commonly used for sport fishing;

(k) to provide a holder which keeps the hook(s), the lure, and the leader sufficiently separated to minimize tangles and snags;

(l) to provide a holder for lures and leaders which minimizes the chances for the leader to suffer cuts or nicks during handling and storage;

(m) to provide a holder which automatically applies sufficient tension to the leader to keep it in place during normal handling but light enough to reduce the possibility that the leader might acquire set;

(n) to provide a holder for lures and leaders while they are being washed off with fresh water;

(o) to provide a holder whereon lures and leaders can be dried after being washed;

(p) to provide a holder which minimizes the risk of cuts and punctures to the hands and fingers of the user;

Further objects and advantages of our invention will become apparent from a consideration of the drawings and ensuing description.

DRAWING FIGURES

Figure 1:
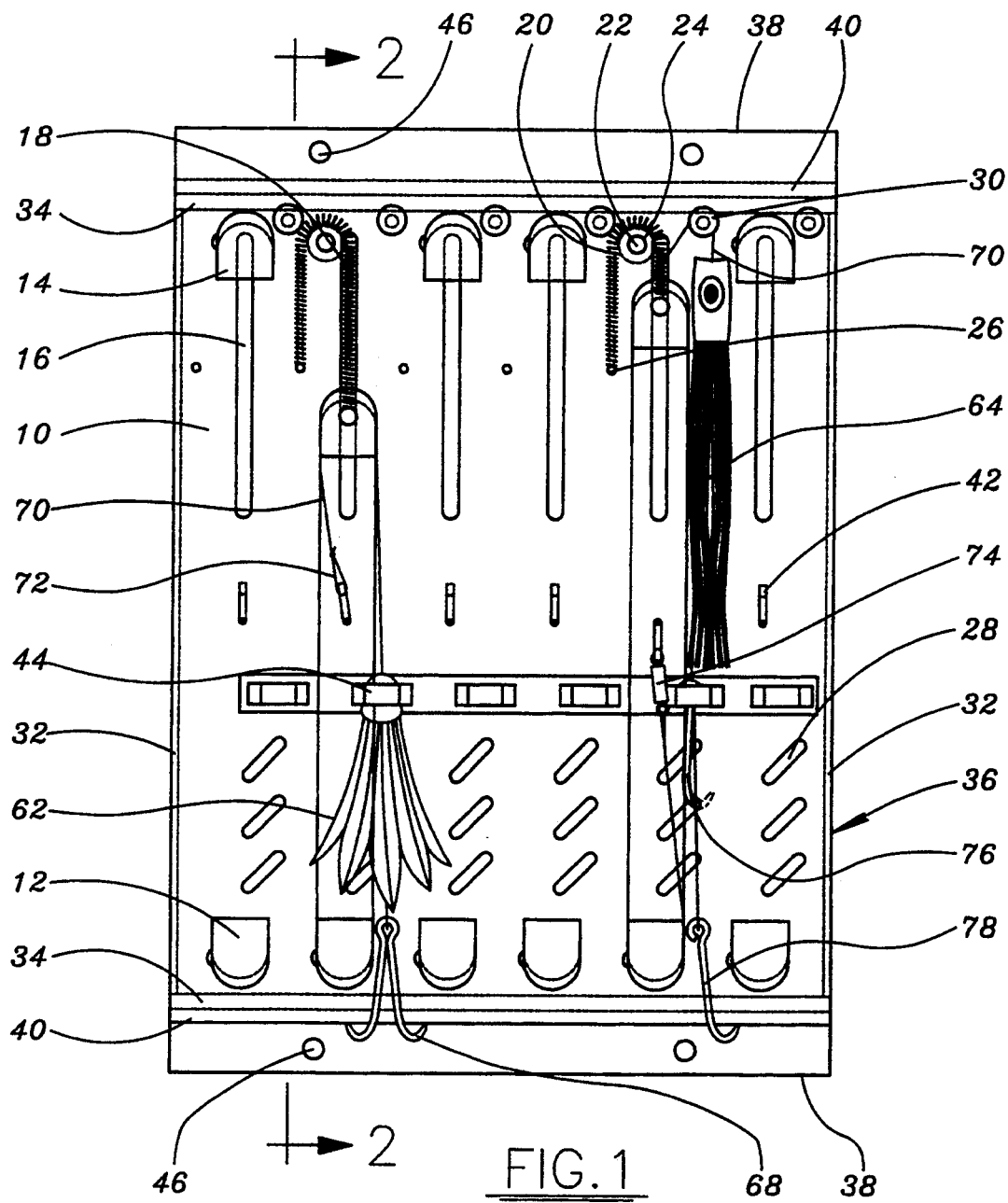
FIG. 1 shows the front panel of our invention with two different lures installed on it.

REFERENCE NUMERALS IN DRAWINGS 10 panel
12 fixed spool
14 sliding spool
16 slot
18 spring
20 roller
22 roller axle
24 axle hole
26 spring attachment point
28 diagonal slots
30 flanged fixed post
32 side spacers
34 end spacers
36 assembly
38 protruding edge
40 soft material
42 hook
44 hook and loop fastener
46 hanging holes
48 boss
50 retaining washer
52 retaining screw
54 cabinet
56 grooves
58 bag or case
60 pocket
62 feathered lure
64 long lure
66 rigid lure
68 lure hook(s)
70 leader
72 leader end loop
74 leader end swivel
76 forward hook
78 rear hook

SUMMARY OF THE INVENTION

Our invention achieves its objectives through the use of two spools mounted on a rectangular panel perpendicular to the plane of the panel. One spool is mounted in a fixed position near one edge of the panel. The other spool is free to slide in a slot in the panel in a direction either directly toward or away from the fixed spool. The slot length is approximately one-half the maximum distance between the two spools. The sliding spool is attached through the slot to a spring located on the other side of the panel. The spring is fastened to the panel in such a manner so as to tend to keep the sliding spool at maximum distance from the fixed spool. In operation, the hook(s) of the lure are restrained by either being imbedded in a soft material along one edge of the panel or inserted into openings in the panel. The leader is then passed 180 degrees around each spool alternatively and tension put on the leader until the sliding spool is not at either end of its allowed travel in the slot and the leader end loop or swivel engaged with a hook mounted near the center of the panel on an imaginary line between the two spools.

DESCRIPTION OF INVENTION

Referring to FIG. 1 it can be seen that our invention consists of a rectangular panel 10 to which is attached a fixed spool 12 and a sliding spool 14. Sliding spool 14 slides in a slot 16 in panel 10 and is attached to a helical extension spring 18 on the opposite side of panel 10. For clarity, only two of these extension springs 18 are shown in FIG. 1. Spring 18 is passed 180 degrees around a roller 20 whose axle 22 rotates in a hole 24 in panel 10 near the end of slot 16 furthest from fixed spool 12 and slightly off to one side. The free end of spring 18 is fastened to the underside of panel 10 at an appropriate point 26 so as to keep the sliding half spool at maximum distance from the fixed spool. Fixed spool 12 is attached near one edge of panel 10 such that it cannot move or rotate. Slot 16 is perpendicular to that edge and its centerline is on an imaginary line between the centers of the two opposing spools and its length is approximately one half the maximum distance between the two spools. Diagonal slots 28 are cut in the panel so as to accept and retain the points of a plurality of tandem hooks. A flanged fixed post 30 is mounted adjacent to each sliding spool as shown. FIG. 1 is depicted with lures attached to two of the possible six positions.

Figure 2:
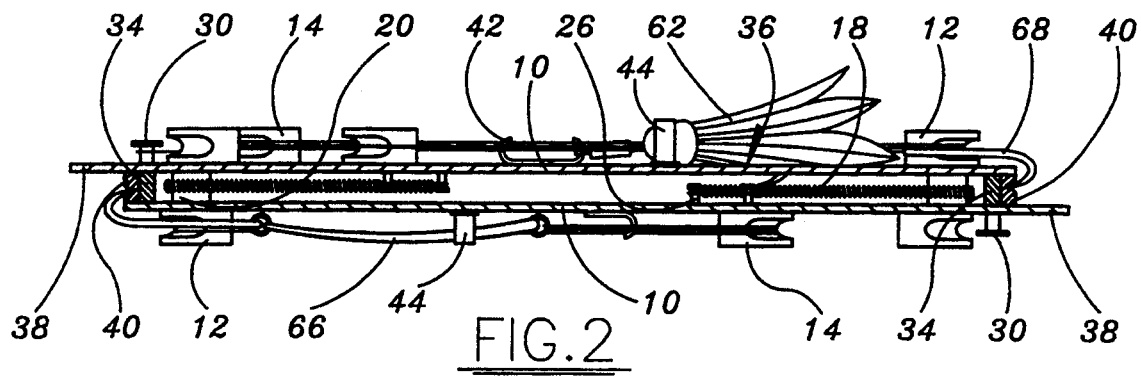
FIG. 2 is a sectional view taken along line 2—2 of FIG. 1 showing the back panel with a third lure installed on it.

FIG. 2, Section 2—2 of FIG. 1, best illustrates the preferred embodiment of our invention. Referring to both FIG. 1 and FIG. 2, two identical panels 10 are mounted back to back using side spacers 32 and end spacers 34 with the spools on the outside of the assembly 36 and the springs and rollers between the panels. One panel is rotated 180 degrees with respect to the other about an axis in the plane of the panel such that the fixed spools are at opposite ends of assembly 36 as shown in FIG. 2. Further, they are offset to develop a protruding edge 38 to provide protection for lure hooks and a tongue for insertion into a cabinet as will be shown later. A soft material 40 capable of accepting and holding the point of the lure hooks without damaging the hooks is affixed to the outside surfaces of end spacers 34. A hook 42 capable of being rotated 360 degrees about an axis perpendicular to panel 10 is mounted on panel 10 on an imaginary line between opposing fixed and sliding spools and about midway between them in order to provide a method of securing the leader end loop or swivel to the panel. In order to provide additional restraining security for lures that are independent of the hooks and can slide on the leaders, hook and loop fasteners 44 are used. One half the fastener is attached to the panel near the midpoint, the other wrapped around the lure as shown. Holes 46 are provided in protruding edges 38 in order to hang the assembly from hooks as described later.

This combination of panel 10, fixed spool 12, sliding spool 14, slot 16, spring 18, roller 20, diagonal slots 28, soft material 40, hook 42, and hook and loop fastener 44 may be repeated along the width of panel 10 at any convenient spacing depending upon the size and type of lures to be accommodated and as many times as necessary depending on the number of lures to be accommodated on each panel 10. Six lure positions on each panel 10 for a total of twelve per assembly 36 are shown in FIG. 1 and FIG. 2 for illustrative purposes only.

Figures 3, 4A, 4B:
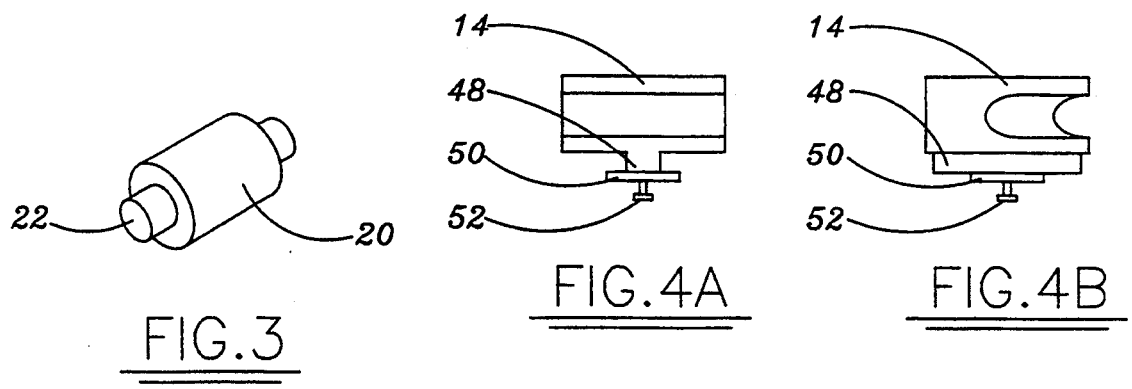
FIG. 3 shows the spring roller.
FIGS. 4A and 4B show the sliding spool.

FIG. 3 provides detail of roller 20 and roller axle 22.

FIGS. 4A and 4B shows sliding spool 14 with its boss 48, retaining washer 50, and retaining screw and spring attachment point 52. Boss 48 is sized so as to allow smooth linear movement in slot 16 while also minimizing rotation of sliding spool 14. Retaining washer 50 and its retaining screw 52 are used to confine sliding spool 14 to slot 16. Retaining screw 52 is also configured to provide an attachment point for spring 18 on sliding spool 14.

Figure 5:
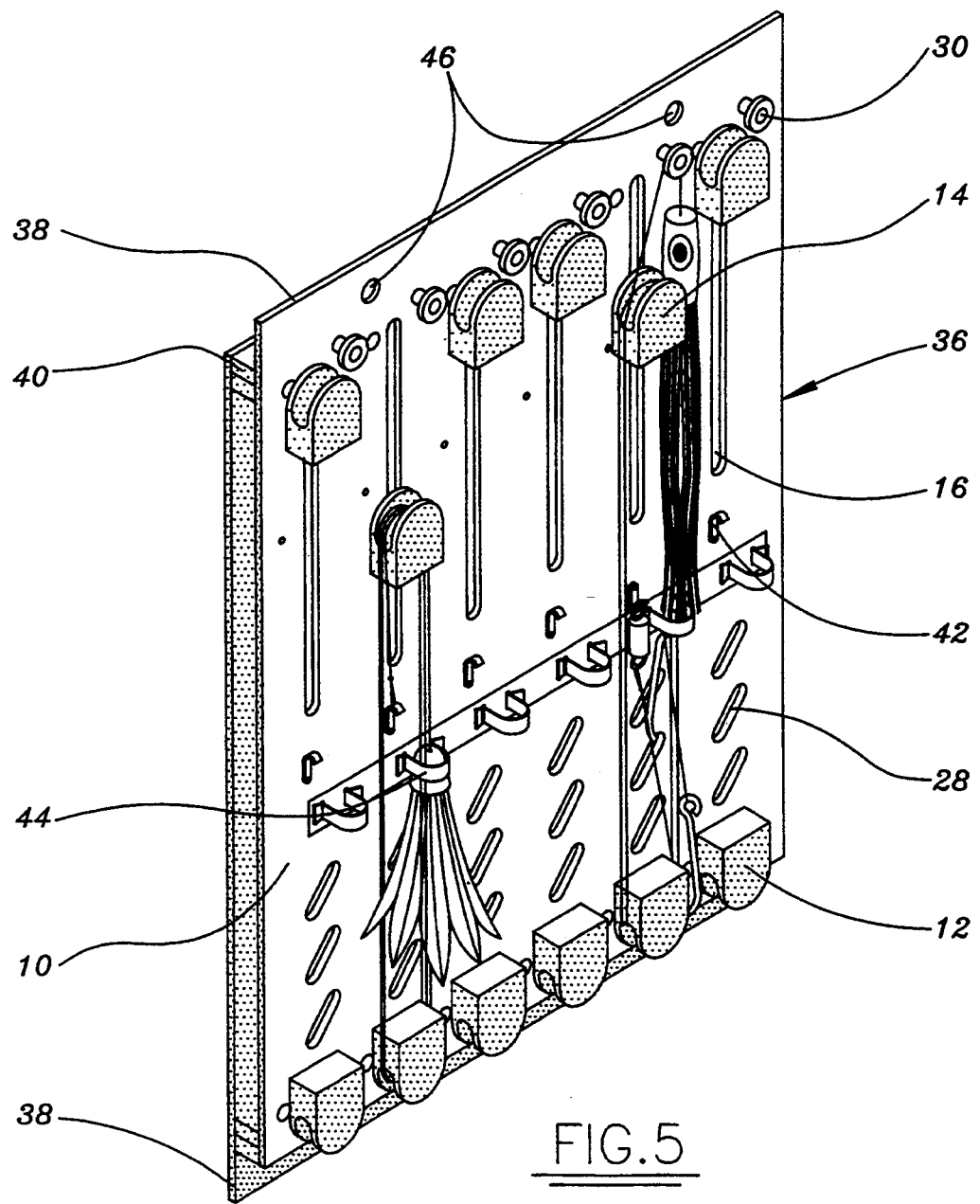
FIG. 5 is an isometric view of our invention with two lures mounted thereon.

FIG. 5 is an isometric view of the preferred embodiment of the invention with two lures mounted on the front panel.

Figure 6:
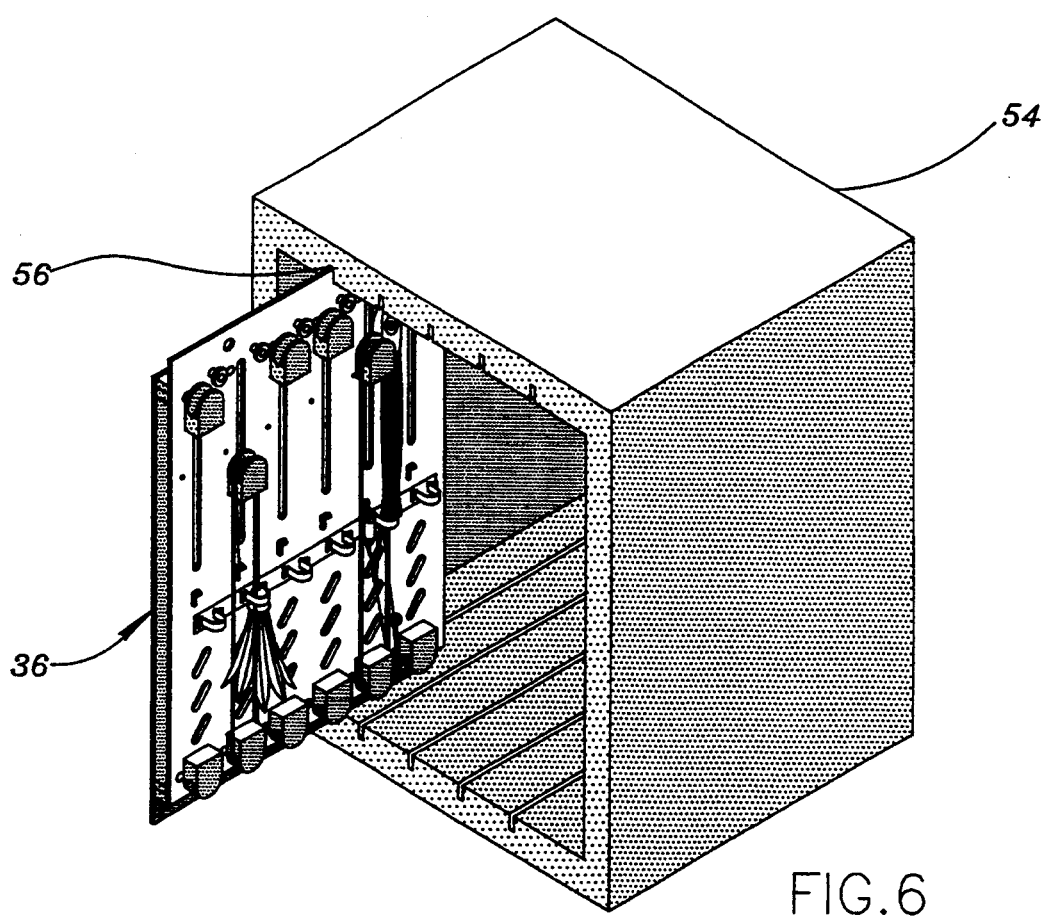
FIG. 6 is an isometric view of a cabinet into which the lure and leader holder can inserted.

FIG. 6 shows a typical cabinet 54 with grooves 56 sized and spaced so as to allow easy insertion and removal of any given number of assemblies 36. Such a cabinet can either be portable or can be a part of the fishing boat or structure from which the fishing is done.

Figure 7:
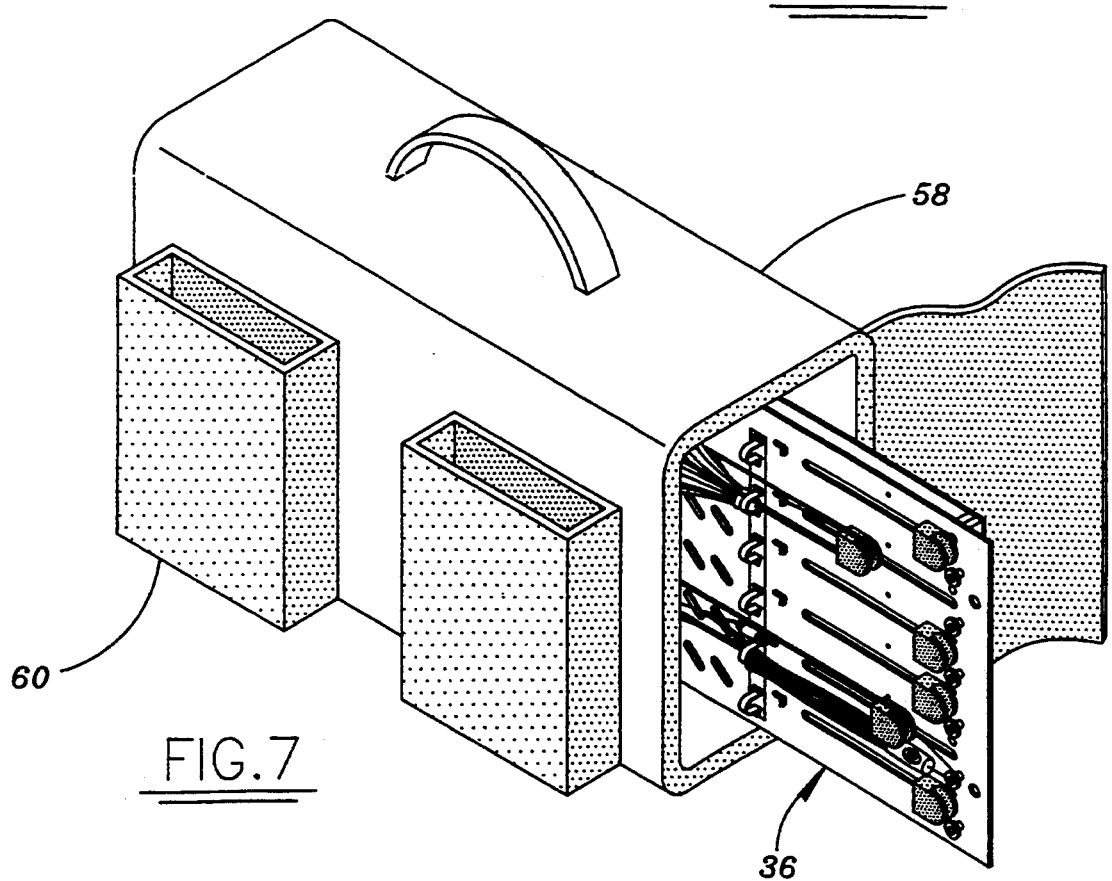
FIG. 7 shows a typical bag which can be used to transport and protect the lure and leader holder.

FIG. 7 shows a typical bag or case 58 having protective padding which can be used to transport one or more units of assembly 36. It may also have pockets 60 for additional equipment.

If it is desired to mount assembly 36 directly to a bulkhead or surface, fixed spools 12, sliding spools 14 together with their associated springs and rollers, flanged fixed posts 30, hooks 42, and hook and loop fasteners 44 may all be eliminated from one of the panels 10 thereby providing a flat surface for mounting.

It is intended that this invention be constructed entirely of non-corrosive materials in order extend its lifetime when operated in a salt water environment and also to allow washing and air-drying of the lures and leaders mounted thereon.

OPERATION OF INVENTION

FIG. 1 and FIG. 2 show three types of lures, 62, 64, and 66, mounted on assembly 36. To mount short lure 62, the points of the lure hook(s) 68 are imbedded in soft material 40 at the ends of assembly 36. The leader 70 is passed around sliding spool 14 for one half turn then around fixed spool 12 for one half turn thence continuing on until by pulling on leader 70 the leader end loop 72 or the leader end swivel 74 can be placed over hook 42 when sliding spool 14 is not at either end of its allowed travel. Hook 42 can be rotated so as to receive the leader end from the direction of either fixed spool 12 or sliding spool 14. To provide additional security, one half of the hook and loop fastener 44 is passed around the lure and engaged with the other half that is fastened to the panel.

In the case of long lure 64 with tandem hooks, the points of the forward hook 76 are passed through appropriate diagonal slots 28, the points of the end hook 68 imbedded in soft material 40 and the first 180 degree turn of the leader passed around flanged fixed post 30, thence proceeding around the sliding and fixed spools and securing the leader end as before. The purpose of flanged fixed post 30 is allow a lure, long with respect to panel 10, to be mounted on the panel securely.

The material, wire gauge, diameter, length, pitch, and panel attachment point of spring 18 are chosen so as to: (a) keep sliding spool 14 snugly against the end of slot 16 furthest away from fixed spool 12 when no lure is installed, (b) provide sufficient tension on the leader of an installed lure so as to keep it in place during normal handling, (c) keep leader tension below that point which might cause set in the leader, and (d) allow easy installation of the lure by hand.

Holes 46 are provided in protruding edges 38 so that assembly 36 may be hung on hooks in a boat or on a structure to allow rapid identification of the lures and ease of installation and removal of the lures while fishing.

SUMMARY, RAMIFICATIONS, AND SCOPE

Accordingly, the reader will see that our invention provides a holder upon which lures of various types and sizes attached to leaders of various lengths and having a plurality of hooks can easily be mounted, stored, and removed therefrom. It has additional advantages in that it:

>allows easy identification of the lures;
>minimizes tangles of lures and leaders;
>can be neatly inserted in a cabinet or case;
>automatically adjusts to leader length;
>minimizes cuts and nicks in leaders;
>allows lures to be washed thereon;
>minimizes dangers to the user.

Although the description above contains many specificities, these should not be construed as limiting the scope of our invention but merely providing illustrations of some of the presently preferred embodiments of this invention. For example, it is obvious that a suitable elastic cord could be substituted for the extension spring; a compression type spring could be used in lieu of the extension spring and roller; further, the panel, side spacers, and end spacers could be molded of one piece which could also have all slots and holes integrally molded therein thereby substantially reducing cost while at the same time preserving all of the operating features.

Thus the scope of the invention should be determined by the appended claims and their legal equivalents, rather than by the examples given.

We claim:

1. A lure and leader holder comprising two identical rectangular rigid panels, each of said panels having an outside surface and an inside surface; a plurality of parallel slots; sliding spools with penetrating bosses constrained to slide in said slots; a corresponding plurality of fixed spools attached adjacent to a first edge of each panel farthest from said sliding spools; means to provide a force biasing said sliding spools away from said fixed spools so as to automatically adjust to leader length; means secured near said first edge of each panel to receive the pointed ends of the hooks of a lure; means located intermediate said sliding spools and fixed spools to attach the end of the leader of the lure to each panel, wherein the inside surfaces of said panels are secured together in spaced relationship such that said fixed and said sliding spools are located on the outside surfaces of said panels, and a second edge of each said panel opposite said first edge protruding beyond said first edge of the other panel thereby defining tongues for engaging said lure and leader holder with grooves of another structure and providing protection for hooks of lures mounted on said lure and leader holder.

2. The lure and leader holder of claim 1 further including holes adjacent said second edge of each panel for attaching said lure and leader holder to another structure.

3. The lure and leader holder of claim 1 further including a plurality of diagonal slots penetrating each panel at an angle of about forty five degrees to the first edge as to constrain the hooks of a lure to said panel when the hooks are inserted therein.

4. The lure and leader holder of claim 1 further including fixed flanged posts mounted on each panel near the second edge adjacent to and on the same surface as said sliding spools.

5. The lure and leader holder of claim 1 wherein said means to provide biasing force on said sliding spool is a helical extension spring located between said panels, said spring being fastened to said boss, thence passed 180 degrees around a roller mounted perpendicularly between said panels and thence fastened to a corresponding panel.

* * * * *